(12) United States Patent
Zhao (10) Patent No.: US 9,369,249 B2
(45) Date of Patent: Jun. 14, 2016

(54) TERMINAL INTER-APPLICATION NETWORK RESOURCE ALLOCATION METHOD AND DEVICE THEREOF

(71) Applicant: Xuefeng Zhao, Beijing (CN)

(72) Inventor: Xuefeng Zhao, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 3 days.

(21) Appl. No.: 14/347,136

(22) PCT Filed: Sep. 26, 2012

(86) PCT No.: PCT/CN2012/081994
§ 371 (c)(1),
(2) Date: Mar. 25, 2014

(87) PCT Pub. No.: WO2013/044795
PCT Pub. Date: Apr. 4, 2013

(65) Prior Publication Data
US 2014/0241299 A1    Aug. 28, 2014

(30) Foreign Application Priority Data
Sep. 26, 2011    (CN) .......................... 2011 1 0287670

(51) Int. Cl.
*H04J 3/16*    (2006.01)
*H04L 12/28*    (2006.01)
(Continued)

(52) U.S. Cl.
CPC ............ *H04L 5/0037* (2013.01); *H04L 47/765* (2013.01); *H04L 47/803* (2013.01)

(58) Field of Classification Search
CPC ..... H04L 65/80; H04L 43/028; H04L 67/322; H04L 43/0882; H04L 47/10; H04L 12/5695; H04L 1/002

USPC ................... 370/468, 329, 395.21, 352–356, 370/229–235, 395.42, 310, 389, 252–254
See application file for complete search history.

(56) References Cited

U.S. PATENT DOCUMENTS

| 7,480,240 | B2 * | 1/2009 | Trac ........................ H04L 47/10 370/230.1 |
| 8,259,566 | B2 * | 9/2012 | Chen ..................... H04L 1/0002 370/230 |

(Continued)

FOREIGN PATENT DOCUMENTS

| CN | 102004671 A | 4/2011 |
| CN | 102479108 A | 5/2012 |

(Continued)

OTHER PUBLICATIONS

International Search Report (in English and Chinese) and Written Opinion of the International Searching Authority (in Chinese) for PCT/CN2012/081994, mailed Jan. 3, 2013; ISA/CN.

(Continued)

*Primary Examiner* — Hanh N Nguyen
(74) *Attorney, Agent, or Firm* — Harness, Dickey & Pierce, P.L.C.

(57) ABSTRACT

A terminal inter-application network resource allocation method comprises the following steps: a terminal determining, according to a set ratio, an allocation ratio of network bandwidth resources for network applications running at the foreground, and according to a statistical result, obtained by the terminal, of operational behavior performed by a user on each network application, determining an allocation ratio of unallocated network bandwidth resources for each network application; the terminal allocating network bandwidth resources to each network application according to the allocation ratio of the network bandwidth resources for each network application. According to the application, bandwidth allocation can be dynamically adjusted in real time according to user operations, so as to solve the problem that, when multiple applications are enabled, the data communication time of a current application increases because the network resources are occupied by other background applications.

16 Claims, 4 Drawing Sheets

(51) Int. Cl.
*H04L 5/00* (2006.01)
*H04L 12/919* (2013.01)
*H04L 12/927* (2013.01)

(56) References Cited

U.S. PATENT DOCUMENTS

| | | | |
|---|---|---|---|
| 8,837,287 B2 * | 9/2014 | Dolganow | H04L 43/028 370/233 |
| 8,854,966 B2 * | 10/2014 | Fadell | H04L 12/5695 370/232 |
| 2005/0100000 A1 | 5/2005 | Faulkner et al. | |
| 2009/0028127 A1 | 1/2009 | Walker et al. | |

FOREIGN PATENT DOCUMENTS

| | | |
|---|---|---|
| EP | 1166560 A1 | 1/2002 |
| EP | 1942615 A1 | 7/2008 |
| WO | WO-0054506 A1 | 9/2000 |

OTHER PUBLICATIONS

Extended European Search Report regarding Application No. 12835857.9, dated May 8, 2015.

\* cited by examiner

TERMINAL INTER-APPLICATION NETWORK RESOURCE ALLOCATION METHOD AND DEVICE THEREOF

The present application is the national phase of International Application No. PCT/CN2012/081994, entitled "TERMINAL INTER-APPLICATION NETWORK RESOURCE ALLOCATION METHOD AND DEVICE THEREOF", filed on Sep. 26, 2012, which claims the benefit of priority to Chinese patent application No. 201110287670.2, titled "TERMINAL INTER-APPLICATION NETWORK RESOURCE ALLOCATION METHOD AND DEVICE THEREOF" and filed with the Chinese State Intellectual Property Office on Sep. 26, 2011, the entire disclosure of which is incorporated herein by reference.

FIELD

The present application relates to the field of communication technology, and in particular to a method for network resource allocation among multiple applications of a terminal, and a device thereof.

BACKGROUND

The existing overall wireless network for intelligent mobile terminals, such as TD-SCDMA (Time Division-Synchronous Code Division Multiple Access), CDMA (Code Division Multiple Access) and WCDMA (Wideband Code Division Multiple Access), generally has a bandwidth of 2 to 4 Mbps, and the actual uplink or download bandwidth in practical application is even narrower, the specific reason of which is relevant to factors such as the environment and signals, etc.

Along with the popularization of intelligent mobile terminals, an ever-increasing number of applications emerge in the market, and more and more applications are dependent on the support of the backstage data servers over the network such as a remote service platform and cloud computation, etc. Since the intelligent mobile terminal is a multi-task operation system, in a case that multiple network applications are running at the backstage, it may become particularly important to occupy enough network bandwidth resources, and it may even occur that the aggregate demand to the network bandwidth resources overtakes the aggregate supply to the multiple applications running on the backstage.

With respect to online data communication requests of multiple network applications, the underlying network of an operation system in an existing common intelligent terminal forwards the requests directly without any limitation to the bandwidth, and the applications occupy the bandwidth in a race manner, which specifically depends on the internal implementation mechanism of the individual applications, such as single-threaded download, multi-threaded download and P2P, etc. Hence if a certain application at the backstage occupies the bandwidth in a malicious manner to communicate with its server, data communication and data exchange of the current application may be slowed down, wait time may be prolonged, and the normal use of the user service may be affected. Also, since the proportion of network bandwidth resources allocated by the system of the existing intelligent mobile terminal to an application is fixed, the originally allocated resources may be not adequate for user requirement as the user changes the operation of the application; accordingly the data communication and data exchange of the current application be slowed down, and wait time may be prolonged.

As can be seen from the above that conventionally the current application in use has no advantages over those running at the backstage in terms of network communication, and the network bandwidth resources are not proper allocated.

SUMMARY

Embodiments of the disclosure provide a method for network resource allocation among multiple applications of a terminal, and a device thereof, so as to obtain a more proper bandwidth allocation of network bandwidth resources among multiple network applications running on the terminal. The bandwidth allocation is adjusted according to a user's operational behavior to the network applications, and the problem that in a case that multiple applications are initiated data communication of the current application is prolonged due to the occupation of network bandwidth resources by other backstage applications is resolved.

An embodiment of the disclosure provides a method for network resource allocation among multiple applications of a terminal. The method includes:

determining, by a terminal, a proportion of network bandwidth resources to be allocated to a network application running at the forestage according to a set proportion, and determining, by the terminal, proportions of un-allocated network bandwidth resources to be allocated to respective network applications according to statistics, obtained by the terminal, of user operational behaviors to respective applications; and allocating, by the terminal, network bandwidth resources to the network applications according to the proportions.

An embodiment of the disclosure provides a terminal device, which includes:

an information collection module, configured to collect and obtain statistics of user operational behaviors to respective applications;

a proportion determination module, configured to determine a proportion of network bandwidth resources to be allocated to a network application running at forestage according to a set proportion, and determine proportions of un-allocated network bandwidth resources to be allocated to respective network applications according to statistics, obtained by the terminal, of user operational behaviors to respective applications; and a resource allocation module, configured to allocate the network bandwidth resources to the network applications according to the proportions determined by the proportion determination module.

The above embodiments of the disclosure have the following beneficial technical effect over the conventional technology.

According to the present technical solution, bandwidth resources are allocated preferentially to the network application running at the forestage, then a proportion at which the network bandwidth resources is to be allocated to every network application is determined according to statistics of user operational behaviors to respective applications, and network bandwidth resources are allocated to respective network applications according to the proportions, which hence solves the problem that in a case that multiple applications are initiated at a terminal the data communication of the current application is prolonged due to the occupation of network bandwidth resources by other backstage applications, ensures a sufficient bandwidth for the current application under use, reduces the time spent in network communication for the current application and enables a smoother presentation.

DETAILED DESCRIPTION

In view that in the existing technology, the system of an intelligent mobile terminal allocates a fixed proportion of network bandwidth resources to applications, which brings the problem that the originally allocated resources may be not adequate for user requirement as the user changes the operation for the applications, and that data communication and exchange of the current application are slowed down, and the wait time is prolonged. In an embodiments of the disclosure, bandwidth resources are allocated preferentially to the network application running at the forestage, then a proportion at which the network bandwidth resources is allocated to every network application is determined according to statistics of user operational behaviors to respective applications, and network bandwidth resources are allocated to respective network applications according to the proportions, which ensures a sufficient bandwidth for the network application running at the forestage, reduces the time spent on network communication for the current network application, and at the same time achieves a real-time, dynamic and reasonable allocation of network bandwidth resources.

Technical solution of the disclosure will be clearly and completely illustrated hereinafter in conjunction with the drawings. Apparently, embodiments described herein are not all but just a few of the embodiments of the disclosure. Other embodiments obtained by those with ordinary skills in the art according to these embodiments without any creative labor fall in the scope of the disclosure.

Figure 1:
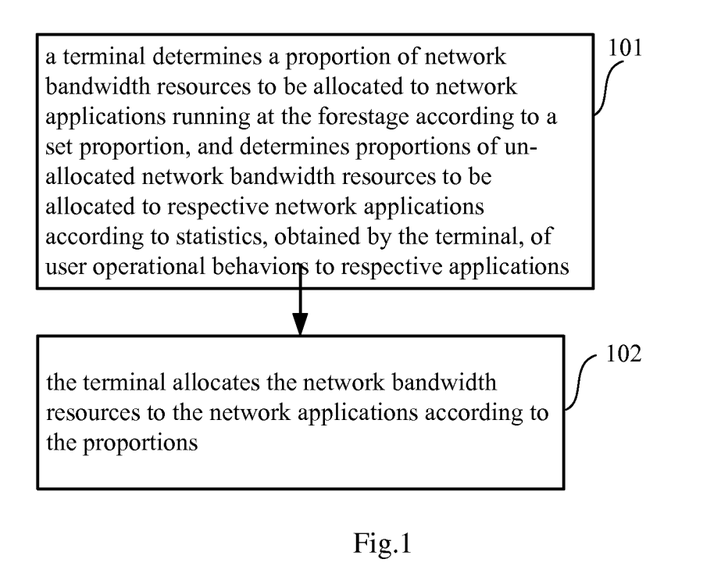
FIG. 1 is a first schematic flowchart for network resource allocation among multiple applications of a terminal provided in an embodiment of the disclosure.

Reference is made to FIG. 1, which is a first schematic flowchart of network resource allocation among multiple applications of a terminal provided in an embodiment of the disclosure. As shown in FIG. 1, the following steps S101 and S102 may be included in the method.

Step 101 is to determine, by a terminal, a proportion of network bandwidth resources to be allocated to a network application running at the forestage according to a set proportion, and to determine by the terminal, proportions of un-allocated network bandwidth resources to be allocated to respective network applications according to statistics, obtained by the terminal, of user operational behaviors to respective applications.

Step 102 is to allocate, by the terminal, the network bandwidth resources to the network applications according to the proportions.

Figure 2:
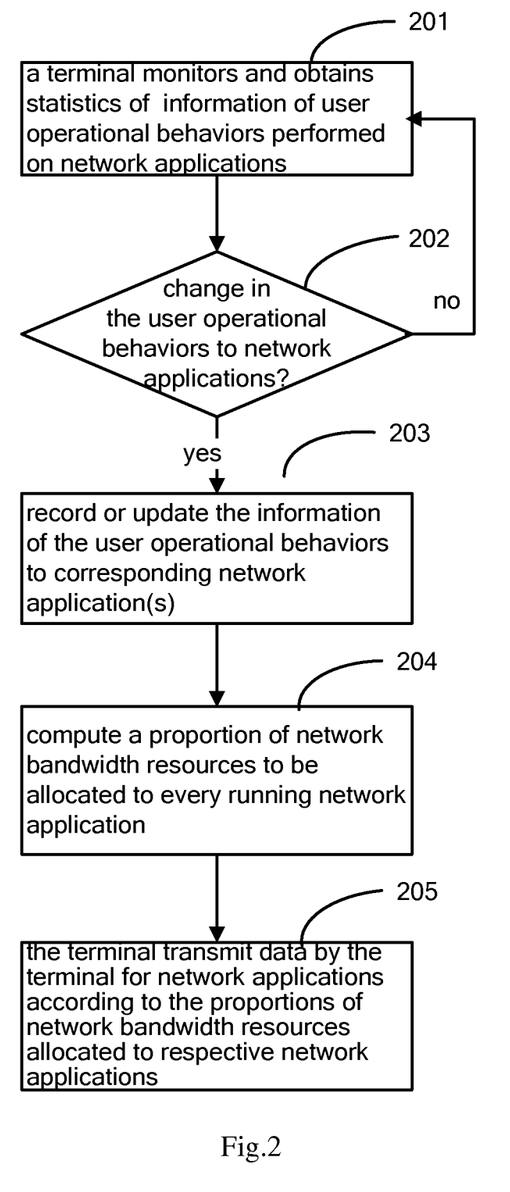
FIG. 2 is a second schematic flowchart for network resource allocation among multiple applications of a terminal provided in an embodiment of the disclosure.

The flow of network resource allocation among multiple applications of a terminal is illustrated in detail in conjunction with embodiments in the following. As shown in FIG. 2, a method for network resource allocation among multiple applications of a terminal includes the following steps.

The First Embodiment

The method for network resource allocation among multiple applications of a terminal is illustrated in detail in conjunction with an embodiment in the following. Referring to FIG. 2, which is a schematic flowchart of network resource allocation among multiple applications of a terminal provided in an embodiment of the disclosure, the method for network resource allocation among multiple applications of a terminal includes the following five steps.

Step 201 is to monitor and obtain statistics of, by a terminal, information of user operational behaviors performed on network applications.

Preferably, a memory table T1 of user behaviors may be created to record the user operational behaviors to each application. Each record in the table T1 consists of P properties $\{X_0, X_1, X_2, X_3, X_4, X_5, X_6, X_7, X_8, \ldots, X_{P-1}\}$, where $X_0$ indicates a naming ID of the network application, which has a sole main key value of the network application, $X_1$ indicates a name of the network application, $X_2$ indicates a time point at which the network application is switched on, $X_3$ indicates whether the network application is a network application running at the forestage, $X_4$ indicates an amount of times that the network application switches between the forestage and backstage status, $X_5$ indicates a time point at which the network application is started for the last time, $X_6$ indicates a duration that a network application last runs at the forestage, $X_7$ indicates a time point that a network application running at the forestage last starts to be used, $X_8$ indicates a duration of interaction with a network application running at the forestage, $X_9$ indicates an amount of network applications running at the forestage, $X_{10}$ indicates whether the network application is a network application running at the backstage, and $X_{11}$ indicates a cumulative usage duration of a network application running at the forestage.

Step 202 is to determine, by the terminal, whether there is a change in the user operational behaviors to network applications according to the monitoring; the procedure proceeds to step 203 in a case there is a change, or the procedure proceeds to step 201 in a case there is no change.

The determining whether there is a change in the user operational behaviors to network applications includes: determining whether there is an increase or decrease in the amount of network applications running at the forestage, determining whether there is an increase or decrease in the amount of network applications running at the backstage, and/or determining whether there is a switch between network applications running at the forestage and network applications running at backstage.

Step 203 is to record or update the information of the user operational behaviors to corresponding network application(s).

The information of the user operational behaviors to corresponding network application(s) may be recorded or updated in table T1 in a case that a certain network application is initiated, used, or switched between the forestage and backstage status.

Step 204 is to compute a proportion of network bandwidth resources to be allocated to every running network application.

Specifically, the terminal firstly determines a proportion of network bandwidth resources to be allocated to the network application running at the forestage according to a set proportion, and then determines proportions of network bandwidth resources to be allocated to respective network applications according to statistics of the user operational behaviors to respective applications.

Preferably, the terminal may compute a degree of user attention that a user pays on every network application according to the information of the user operational behaviors to respective applications recorded by the terminal (for example in the above table T1), and determine a proportion of network bandwidth resources to be allocated to a corresponding application according to the degree of attention that the user pays on the network application.

Specifically, there are two ways for the terminal to allocate network bandwidth resources to all the current network applications.

The first way is as follows. The terminal determines an initial proportion of network bandwidth resources to be allocated to the network application running at the forestage according to a set proportion, determines proportions of un-allocated network bandwidth resources to be allocated to respective network applications according to statistics of the user attention degrees to respective applications, and determines the sum of the proportion of the un-allocated network bandwidth resources to be allocated to the network application running at the forestage and the initial proportion as a proportion to be allocated to the forestage network application. For example, after a proportion of 50% network bandwidth resources is allocated to the application running at the forestage, the remaining 50% of network bandwidth resources are allocated among all the applications according to the user attention degrees to all the network applications, and the total network bandwidth resources to be allocated to the network application running at the forestage is equivalent to a sum of the initial proportion of 50% plus the proportion subsequently allocated.

The second way is as follows. The terminal determines a proportion of network bandwidth resources to be allocated to the network application running at the forestage according to a set proportion, and determines a proportion of un-allocated network bandwidth resources to be allocated to the network applications running at the backstage according to the statistics of the user attention degrees to respective applications. For example, after 50% network bandwidth resources are allocated to the network application running at the forestage, the remaining 50% of network bandwidth resources are allocated among the backstage applications according to the user attention degrees to respective applications. The backstage application herein refers to network applications in addition to the network application running at the forestage.

Step 205 is to transmit data by the terminal for network applications according to the proportions of network bandwidth resources allocated to respective network applications.

Specifically, the terminal determines priorities of respective network applications according to the proportions of network bandwidth resources allocated to respective network applications, and transmits data for the network applications according to the priorities of respective network applications. After data of a network application with a higher priority is transmitted, data of a network application with a lower priority begins to be transmitted, i.e., parallel data packages are changed into serial data packages according to the priorities and are sent to the data link layer for transmission. An underlying network control program obtains an allocated percentage of network bandwidth resources according to a network port and an IP address, and sends communication data packages according to the allocated percentage of network bandwidth resources.

The Second Embodiment

The difference of the second embodiment from the first embodiment lies in that, in the second embodiment, the terminal initiates an operation of allocating network bandwidth resources to network applications in a case the terminal determines that there is no change in user operational behaviors to network applications for a duration longer than a set duration. The network bandwidth allocation process is the same as that in the first embodiment, which is not repeated herein.

In practical implementation, the terminal may configure a timer having a predetermined timing period. Whenever the terminal detects that there is a change in the user operational behaviors to the network applications or the operation of allocating network bandwidth resources is initiated, the timer is reset for timing. In a case that the set timing period of the timer is passed, it means that there is no change in the user operational behaviors to the network applications for a duration longer than the set timing period, and at this time the terminal initiates the operation of allocating network bandwidth resources and resets the timer.

Figure 3:
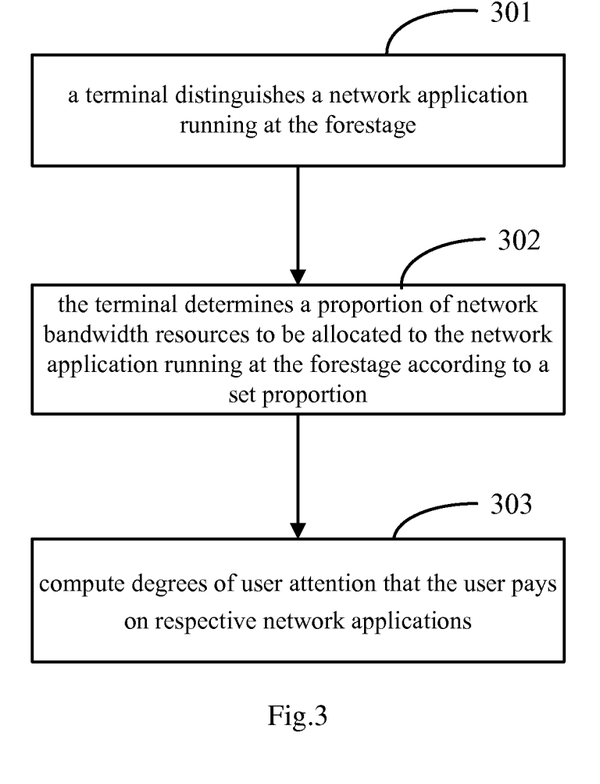
FIG. 3 is a schematic flowchart of determining an allocation proportion of network bandwidth resources during the flow of network resource allocation among multiple applications of a terminal provided in an embodiment of the disclosure.

The flow of determining an allocation proportion of network bandwidth resources (as in step 204) in the network resource allocation among multiple applications of a terminal provided in the first or the second embodiment of the disclosure is further illustrated in the following in conjunction with FIG. 3, where the above described second way of network bandwidth resource allocation is taken as an example for description. As shown in FIG. 3, the following three steps may be included in the flow.

Step 301 is to distinguish, by the terminal, a network application running at the forestage.

Specifically, the terminal may distinguish the network application running at the forestage and those running at the backstage according to the $X_3$ value of every network application recorded in the table T1.

Step 302 is to determine, by the terminal, a proportion of network bandwidth resources to be allocated to the network application running at the forestage according to a set proportion.

Specifically, a preset proportion of bandwidth resources (such as 50% of bandwidth resources) may be allocated to the network application running at the forestage to ensure a smooth data communication of the network application running at the forestage.

Step 303 is to compute, by the terminal, degrees of user attention that the user pays on respective network applications and allocate the remaining network bandwidth resources according to the degrees of attention to the respective network application.

The user attention degree may be one of the following parameters of a network application: a proportion that a valid usage duration occupies in an on-state duration; a last un-used duration; and a usage frequency. Specifically:

(1) The proportion of the valid usage duration for a network application, i.e., the proportion that a valid usage duration occupies in an on-state duration, is taken as a user attention degree to be used in the network resource allocation, which may be implemented through the following formula:

$$appvaliduse_k = \frac{app_k X_{11}}{currenttime - app_k X_2} \quad [1]$$

where $appvaliduse_k$ indicates the proportion of the valid usage duration of the k-th network application, $app_k X_{11}$ indicates the cumulative usage duration of the k-th network application, currenttime indicates the current time point, and $app_kX_2$ indicates the time point at which the k-th network application is switched on.

A proportion of network bandwidth resources to be allocated to a network application is determined by:

$$appvaliduse(k) = \frac{appvaliduse_k}{\sum_{i=0}^{n} appvaliduse_i} \times 100\% \qquad [2]$$

where appvaliduse(k) indicates the proportion of network bandwidth resources to be allocated to the k-th network application, and n indicates the amount of all the network applications or an amount of the applications running at the backstage.

(2) The last un-used duration of a network application is taken as a user attention degree to be used in network resource allocation, which may be implemented through the following formula:

$$applastfree_k = currenttime - app_kX_5 - app_kX_6 \qquad [3]$$

where $applastfree_k$ indicates the last un-used duration of the k-th network application, currenttime indicates the current time point, $app_k X_5$ indicates the last time point that the k-th network application stars to be used, and $app_k X_6$ indicates a duration that the k-th network application is last used as a forestage application.

A proportion of network bandwidth resources to be allocated to a network application is determined by:

$$applastfree(k) = \frac{\sum_{i=0}^{n} applastfree_i - applastfree_k}{\sum_{i=0}^{n} applastfree_i} \times 100\% \qquad [4]$$

where applastfree(k) indicates the proportion of network bandwidth resources to be allocated to the k-th network application, and n indicates the amount of all the network applications or the amount of the applications running at the backstage.

(3) the usage frequency of a network application is taken as a user attention degree to be used in network resource allocation, which may be implemented through the following formula:

$$frequent_k = \frac{app_k X_4}{app_k X_6} \qquad [5]$$

where $frequent_k$ indicates the usage frequency of the k-th network application, $app_k X_4$ indicates the amount of times that the k-th network application switches status, and $app_k X_6$ indicates a duration that the k-th network application is last used as a forestage application.

A proportion of network bandwidth resources to be allocated to a network application is determined by:

$$appfrequent(k) = \frac{frequent_k}{\sum_{i=0}^{n} frequent_i} \times 100\% \qquad [6]$$

wherein appfrequent(k) indicates the proportion of network bandwidth resources to be allocated to the k-th network application, and n indicates the amount of all the network applications or the amount of the applications running at the backstage.

(4) In a case that the terminal uses two or more parameters of the attention degree, the terminal may set a weight to each of the parameters of the attention degree, and after proportions of network bandwidth resources are computed respectively according to the parameters of the user attention degree, obtain a weighted sum of the proportions according to the weights corresponding to the user attention degree, and accordingly obtain the proportions of the remaining network bandwidth resources to be allocated to the network applications. For example, assuming that the weight of the "proportion of a valid usage duration of a network application" is 20%, and the weight of the "last un-used duration of a network application" is 30%, after the proportions of network bandwidth resources to be allocated to a certain network application are computed respectively through formula (1) and formula (2), the two proportions are summed up after being multiplied respectively by their own weights, and accordingly a proportion of the remaining network bandwidth resources to be allocated to the network application is obtained.

For example, in a case that the terminal computes the attention degree of the network application according to the above described 3 types of statistical parameters and the remaining proportion of bandwidth resources is 50%, the weights set corresponding to the above user attention degrees may be: the weight of the valid usage duration proportion is 10%, the weight of the last un-used duration is 25%, and the weight of the usage frequency is 15%.

In step 303, after allocating the remaining network bandwidth resources according to the attention degrees to respective network applications, it is further necessary to sum up the proportion of the remaining network bandwidth resources allocated to the forestage network application and the initial proportion of network bandwidth resources previously allocated to the forestage network application, so as to obtain a final proportion of network bandwidth resources to be allocated to the forestage network application.

In order to simplify the technical implementation, in practice, a resources allocation proportion table T2 for the network applications may be created in advance for storing the proportions of network bandwidth resources to be allocated to the respective network applications. The following properties may be included in the table: a naming ID of a network application, a name of a network application, a communication network port, an IP address, and a corresponding proportion of network bandwidth resources. After computing the proportions of network bandwidth resources to be allocated to the currently-running network applications, the terminal updates the table T2 according to the computation result so as to process according to the table during the network resource allocation.

With respect to computing an attention degree of a network application through two or more statistical parameters in step 303 during the above flow, an alternative way is as follows. The terminal may preset a weight to each of the parameters, after all the user attention degrees are computed, obtain a weighted sum of user attention degrees according to the corresponding weights, thereby obtaining a comprehensive user attention degree and then compute a proportion of network bandwidth resources to be allocated to a network application according to the comprehensive user attention degree.

As can be seen from the above description that in the embodiment of the disclosure, bandwidth resources are allocated preferentially to the network application running at the forestage, then a proportion at which the network bandwidth resources is to be allocated to every network application is determined according to statistics of user operational behaviors to respective applications, and network bandwidth resources are allocated to respective network applications according to the proportions, which hence solves the problem that in a case that multiple applications are initiated at a terminal the data communication of the current application is prolonged due to the occupation of network bandwidth resources by other backstage applications, ensures a sufficient bandwidth for the current application under use, reduces the time spent in network communication for the current application and enables a smoother presentation.

Based on the same technical concept, embodiments of the disclosure also provide a terminal device.

Figure 4:
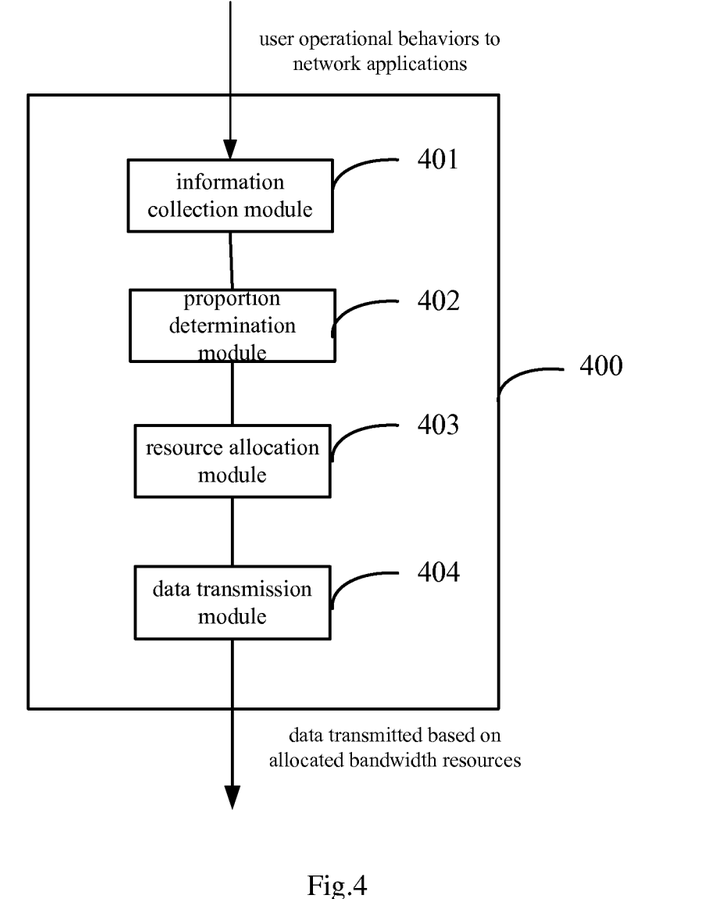
FIG. 4 is a schematic structural diagram of a terminal device provided in an embodiment of the disclosure.

Reference can be made to FIG. 4, which is a structural diagram of a terminal device provided in an embodiment of the disclosure. As shown in FIG. 4, the terminal 400 may include an information collection module 401, a proportion determination module 402, and a resource allocation module 403.

The information collecting module 401 is configured to collect and obtain statistics of user operational behaviors to respective applications.

The proportion determination module 402 is configured to determine a proportion of network bandwidth resources to be allocated to the network application running at the forestage according to a set proportion and determine proportions of un-allocated network bandwidth resources to be allocated to respective network applications according to statistics, obtained by the terminal, of user operational behaviors to respective applications.

The resource allocation module 403 is configured to allocate network bandwidth resources to the network applications according to the proportions determined by the proportion determination module 402.

Specifically, the proportion determination module 402 is configured to determine an initial proportion to be allocated to the network application running at the forestage according to the set proportion, determine a proportion of the un-allocated network bandwidth resources to be allocated to each of all the network applications according to the obtained statistics of user operational behaviors to respective applications, and determine the sum of the proportion of the un-allocated network bandwidth resources to be allocated to the network application running at the forestage and the initial proportion as a proportion to be allocated to the network application running at the forestage; or determine the proportion of network bandwidth resources to be allocated to the network application running at the forestage according to a set proportion and determine a proportion of un-allocated network bandwidth resources to be allocated to a network application running at the backstage according to the obtained statistics of user operational behaviors to respective applications.

Specifically, the proportion determination module 402 is configured to determine a proportion of network bandwidth resources to be allocated to a network application according to any one of or a combination of the following parameters of the network application: a proportion that a valid usage duration occupies in an on-state duration; a last un-used duration; and a usage frequency. In a case that two or more parameters are used, the proportion determination module is further configured to determine a percentage of network bandwidth resources to be allocated to a network application according to each of the parameters; and obtain a percentage of network bandwidth resources to be allocated to the network application from a weighted sum of percentages of network bandwidth resources to be allocated to the network application corresponding to each of the parameters according to the weights of the parameters; where the sum of the weights of the parameters and the value of the set proportion is 1.

Preferably, the proportion determination module 402 is specifically configured to determine for a network application a proportion of the valid usage duration through formula [1], determine a proportion of network bandwidth resources allocated to a network application through formula [2], determine a last un-used duration of a network application through formula [3], determine a proportion of network bandwidth resources allocated to a network application through formula [4], determine a usage frequency of a network application through formula [5], and determine a proportion of network bandwidth resources allocated to a network application through formula [6].

The information collecting module 401 is specifically configured to record or update information of user operational behaviors to respective applications in a case that a certain network application is initiated, used, or switched between the forestage and backstage status, where the information of the user operational behaviors to respective applications includes any one of or a combination of the following: a time point that a user switches on a network application, an amount of times that the user switches network applications, a time point that a user starts to use a network application and whether a network application runs at the forestage.

The terminal device provided in the present embodiment may allocate bandwidth resources preferentially to network the application running at the forestage, then determines a proportion at which the network bandwidth resources is to be allocated to every network application according to statistics of the user operational behaviors to respective applications, and further allocate network bandwidth resources to respective network applications according to the proportions, which hence solves the problem that in a case that multiple applications are initiated at a terminal the data communication of the current application is prolonged due to the occupation of network bandwidth resources by other backstage applications, ensures a sufficient bandwidth for the current application under use, reduces the time spent in network communication for the current application and enables a smoother presentation.

In another embodiment of the terminal device provided in the disclosure, the terminal device 400 may further include: a data transmission module 404 which is configured to determine priorities of respective network applications according to proportions of network bandwidth resources allocated to respective network applications, and transmits data of corresponding network applications according to the priorities of respective network applications, where after data of a network application with a higher priority is transmitted, data of a network application with a lower priority begins to be transmitted.

It should be understood by those skilled in the art that modules of the device in the embodiment may be located in the device according to the embodiment as described herein, or may be distributed in one or more devices according to different embodiments with necessary modification. The multiple modules in the above embodiment may be combined as one module or may be further separated into multiple sub-modules.

By the foregoing description of the embodiments, those skilled in the art may understand clearly that the present disclosure may be implemented via software and necessary hardware platform, or via the hardware only; in most cases, the former is preferable. In view of this, all or part of the embodiments of the disclosure may be implemented by software product, where the software product may be stored in readable storage medium, such as ROM/RAM, disk or optical disk, and multiple instructions are included in the software product to enable a computer device (personal computer, server or network device) to implement the method provided according to each embodiment or certain part of the embodiment of the disclosure.

Preferable embodiments of the present disclosure are set forth above. However, it is to be noted that various changes and modifications may be made by those skilled in the art without departing from the principle of the disclosure, and these changes and modifications should fall in the scope of protection of this disclosure.

What is claimed is:

1. A method for network resource allocation among multiple applications of a terminal, comprising:
    determining, by the terminal, a proportion of network bandwidth resources to be allocated to a network application running at forestage according to a set proportion, and determining, by the terminal, proportions of un-allocated network bandwidth resources to be allocated to respective network applications according to statistics, obtained by the terminal, of user operational behaviors to respective applications, wherein the statistics, obtained by the terminal, of user operational behaviors to respective applications is obtained by recording or updating information of the user operational behaviors to respective applications in a case that a network application is initiated, used, or switched between the forestage and backstage, wherein the information of the user operational behaviors to respective applications comprises one or any combination of the following: a time point that a user switches on the network application, an amount of times that the user switches the network application, a time point that the user starts to use the network application, and whether the network application runs at the forestage; and
    allocating, by the terminal, the network bandwidth resources to the network applications according to the proportions.

2. The method according to claim 1, wherein the determining, by the terminal, a proportion of network bandwidth resources to be allocated to the network application running at the forestage according to a set proportion and determining proportions of un-allocated network bandwidth resources to be allocated to respective network applications according to statistics, obtained by the terminal, of user operational behaviors to respective applications comprises:
    determining, by the terminal, an initial proportion of network bandwidth resources to be allocated to the network application running at the forestage according to the set proportion, determining, by the terminal, a proportion of the un-allocated network bandwidth resources to be allocated to each of all the network applications according to the statistics, obtained by the terminal, of user operational behaviors to respective applications, and determining a sum of the proportion of the un-allocated network bandwidth resources to be allocated to the network application running at the forestage and the initial proportion as a proportion to be allocated to the network application running at the forestage;

or,
    determining, by the terminal, the proportion of network bandwidth resources to be allocated to the network application running at the forestage according to the set proportion, and determining a proportion of un-allocated network bandwidth resources to be allocated to a network application running at the backstage according to statistics, obtained by the terminal, of user operational behaviors to respective applications.

3. The method according to claim 1, wherein determining, by the terminal, a proportion of network bandwidth resources to be allocated to a network application is according to one of or any combination of the following parameters:
    a proportion that a valid usage duration occupies in an on-state duration;
    a last un-used duration; and
    a usage frequency.

4. The method according to claim 3, wherein in a case that two or more parameters are used by the terminal, determining, by the terminal, a proportion of network bandwidth resources to be allocated to a network application comprises:
    determining, by the terminal, a percentage of network bandwidth resources to be allocated to a network application according to each of the parameters; and
    obtaining, by the terminal, a percentage of network bandwidth resources to be allocated to the network application from a weighted sum of percentages of network bandwidth resources to be allocated to the network application corresponding to each of the parameters based on weights of the parameters;
    wherein a sum of the weights of the parameters and a value of the set proportion is 1.

5. The method according to claim 3, wherein determining, by the terminal, a proportion of network bandwidth resources to be allocated to a network application according to the proportion that the valid usage duration occupies in the on-state duration comprises:
    determining for the network application, by the terminal, the proportion of the valid usage duration through the following formula:

$$appvaliduse_k = \frac{app_k X_{11}}{currenttime - app_k X_2}$$

wherein, $appvaliduse_k$ indicates the proportion of the valid usage duration of a k-th network application, $app_k X_{11}$ indicates a cumulative usage duration of the k-th network application, currenttime indicate a current time point, and $app_k X_2$ indicates a time point at which the k-th network application is switched on; and
    determining, by the terminal, the proportion of network bandwidth resources to be allocated to the network application through the following formula:

$$appvaliduse(k) = \frac{appvaliduse_k}{\sum_{i=0}^{n} appvaliduse_i} \times 100\%$$

wherein, appvaliduse(k) indicates the proportion of network bandwidth resources to be allocated to the k-th network application, and n indicates an amount of all the network applications or an amount of network applications running at the backstage.

6. The method according to claim 3, wherein determining, by the terminal, a proportion of network bandwidth resources to be allocated to a network application according to the last un-used duration comprises:
determining, by the terminal, the last un-used duration through the following formula:

$$applastfree_k = currenttime - app_k X_5 - app_k X_6$$

wherein, applastfree$_k$ indicates the last un-used duration of a k-th network application, currenttime indicates a current time point, app$_k$X$_5$ indicates a last time point that the k-th network application starts to be used, and app$_k$X$_6$ indicates a duration that the k-th network application is last used as a forestage application; and determining, by the terminal, the proportion of the network bandwidth resources to be allocated to network applications through the following formula:

$$applastfree(k) = \frac{\sum_{i=0}^{n} applastfree_i - applastfree_k}{\sum_{i=0}^{n} applastfree_i} \times 100\%$$

wherein applastfree(k) indicates the proportion of the network bandwidth resources to be allocated to the k-th network application and n indicates an amount of all the network applications or an amount of network applications running at the backstage.

7. The method according to claim 3, wherein determining, by the terminal, the proportion of network bandwidth resources to be allocated to a network application according to the usage frequency of the network application comprises:
determining, by the terminal, the usage frequency of the network application through the following formula:

$$frequent_k = \frac{app_k X_4}{app_k X_6}$$

wherein, frequent$_k$ indicates the usage frequency of a k-th network application, app$_k$X$_4$ indicates an amount of times that the k-th network application is switched, and app$_k$X$_6$ indicates a duration that the k-th network application is last used as a forestage application; and determining, by the terminal, the proportion of the network bandwidth resources to be allocated to the network application through the following formula:

$$appfrequent(k) = \frac{frequent_k}{\sum_{i=0}^{n} frequent_i} \times 100\%$$

wherein, appfrequert(k) indicates the proportion of the network bandwidth resources to be allocated to the k-th network application and n indicates an amount of all the network applications or an amount of network applications running at the backstage.

8. The method according to claim 1, further comprising:
when transmitting data based on allocated network bandwidth resources, determining, by the terminal, priorities of respective network applications according to the proportions of network bandwidth resources allocated to respective network applications, and transmitting the data of corresponding network applications according to the priorities of respective network applications, wherein, after data of a network application with a higher priority is transmitted, data of a network application with a lower priority begins to be transmitted.

9. A terminal device, comprising:
an information collection module, configured to collect and obtain statistics of user operational behaviors to respective applications;
a proportion determination module, configured to determine a proportion of network bandwidth resources to be allocated to a network application running at forestage according to a set proportion, and determine proportions of un-allocated network bandwidth resources to be allocated to respective network applications according to statistics, obtained by the terminal, of user operational behaviors to respective applications, wherein the information collection module is further configured to record or update information of the user operational behaviors to respective applications in a case that a network application is initiated, used, or switched between the forestage and backstage status, wherein the information of the user operational behaviors to respective applications comprises one or any combination of the following:
a time point that a user switches on the network application, an amount of times that the user switches the network application, a time point that the user starts to use the network application, and whether the network application runs at the forestage; and
a resource allocation module, configured to allocate the network bandwidth resources to the network applications according to the proportions determined by the proportion determination module.

10. The terminal device according to claim 9, wherein the proportion determination module is further configured to determine an initial proportion to be allocated to the network application running at the forestage according to the set proportion, determine a proportion of the un-allocated network bandwidth resources to be allocated to each of all the network applications according to the statistics, obtained by the terminal, of user operational behaviors to respective applications, and determine a sum of the proportion of the un-allocated network bandwidth resources to be allocated to the network application running at the forestage and the initial proportion as a proportion to be allocated to the network application running at the forestage; or
to determine the proportion of network bandwidth resources to be allocated to the network application running at the forestage according to the set proportion, and determine a proportion of un-allocated network bandwidth resources to be allocated to a network application running at the backstage according to the statistics, obtained by the terminal, of the user operational behaviors to respective applications.

11. The terminal device according to claim 9, wherein the proportion determination module is further configured to determine the proportion of network bandwidth resources to be allocated to a network application according to one of or any combination of the following parameters of the network application:
a proportion between a valid usage duration and an on-state duration;
a last un-used duration; and
a usage frequency.

12. The terminal device according to claim 11, wherein the proportion determination module is further configured to, in a case that two or more parameters are used, determine a percentage of network bandwidth resources to be allocated to a network application according to each of the parameters, and obtain a percentage of network bandwidth resources to be allocated to the network application from a weighted sum of percentages of network bandwidth resources to be allocated to the network application corresponding to each of the parameters based on weights of the parameters; wherein a sum of the weights of the parameters and a value of the set proportion is 1.

13. The terminal device according to claim 11, wherein the proportion determination module is further configured to determine for a network application the proportion of the valid usage duration through the following formula:

$$appvaliduse_k = \frac{app_k X_{11}}{currenttime - app_k X_2}$$

wherein, $appvaliduse_k$ indicates the proportion of the valid usage duration of a k-th network application, $app_k X_{11}$ indicates a cumulative usage duration of the k-th network application, currenttime indicates a current time, and $app_k X_2$ indicates the time point of the k-th network application is opened; and to determine the proportion of network bandwidth resources to be allocated to the network application through the following formula:

$$appvaliduse(k) = \frac{appvaliduse_k}{\sum_{i=0}^{n} appvaliduse_i} \times 100\%$$

wherein, appvaliduse(k) indicates the proportion of network bandwidth resources to be allocated to the k-th network application and n indicates an amount of all the network applications or an amount of network applications running at the backstage.

14. The terminal device according to claim 11, wherein the proportion determination module is further configured to determine the last un-used duration of the network application through the following formula:

$$applastfree_k = currenttime - app_k X_5 - app_k X_6$$

wherein, appfrequert(k) indicates the last un-used duration of a k-th network application, currenttime indicates a current time point, $app_k X_5$ indicates a time point that the k-th network application last starts to be used, and $app_k X_6$ indicates a duration that the k-th network application is last used as a forestage application; and to determine the proportion of network bandwidth resources to be allocated to the network application through the following formula:

$$applastfree(k) = \frac{\sum_{i=0}^{n} applastfree_i - applastfree_k}{\sum_{i=0}^{n} applastfree_i} \times 100\%$$

wherein, appfrequert(k) indicates the proportion of network bandwidth resources to be allocated to the k-th network application and n indicates an amount of all the network applications or an amount of network applications running at the backstage.

15. The terminal device according to claim 11, wherein the proportion determination module is further configured to determine the usage frequency of a network application through the following formula:

$$frequent_k = \frac{app_k X_4}{app_k X_6}$$

wherein, $frequent_k$ indicates the usage frequency of a k-th network application, $app_k X_4$ indicates an amount of times that the k-th network application is switched, and $app_k X_6$ indicates a duration that the k-th network application is last used as a forestage application; and to determine the proportion of network bandwidth resources to be allocated to the network application through the following formula:

$$appfrequent(k) = \frac{frequent_k}{\sum_{i=0}^{n} frequent_i} \times 100\%$$

wherein, appfrequert(k) indicates the proportion of the network bandwidth resources to be allocated to the k-th network application and n indicates an amount of all the network applications or an amount of network applications running at the backstage.

16. The terminal device according to claim 9, further comprising:

a data transmission module, configured to determine priorities of respective network applications according to the proportions of network bandwidth resources allocated to respective network applications, and transmit data of corresponding network applications according to the priorities of respective network applications, wherein, after data of a network application with a higher priority is transmitted, data of a network application with a lower priority begins to be transmitted.

* * * * *